J. B. HEIGHINGTON.
MACHINE FOR TOOLING STONE.
APPLICATION FILED APR. 19, 1907.

909,296.

Patented Jan. 12, 1909.

6 SHEETS—SHEET 1.

Witnesses
H. Young
A. G. Vaisey

Inventor:
J B Heighington
by Fred B Fetherstonhaugh
atty.

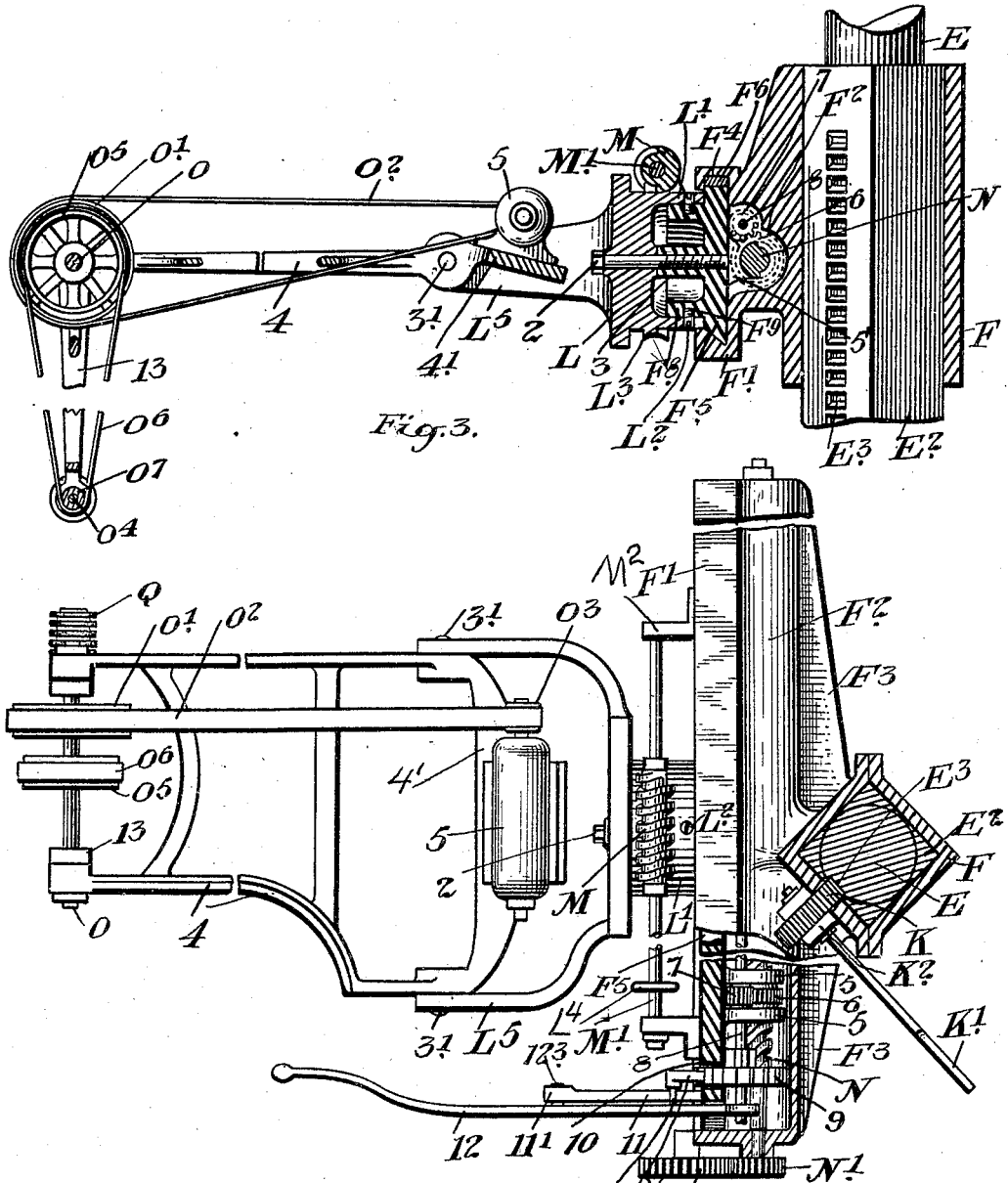

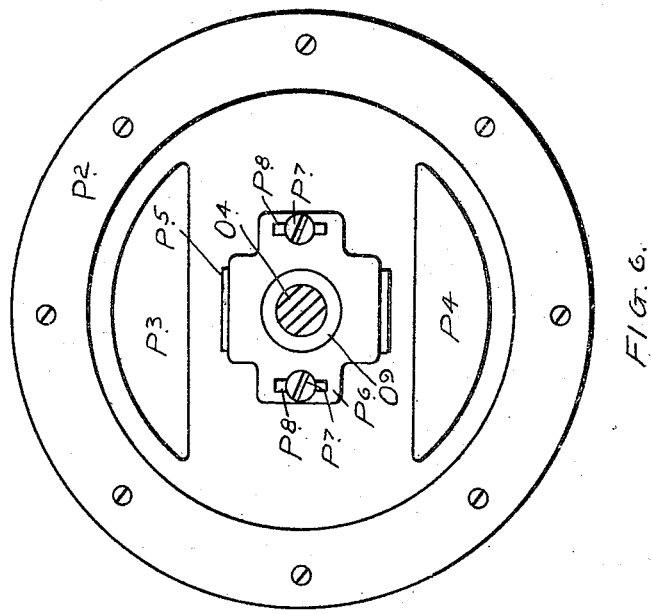
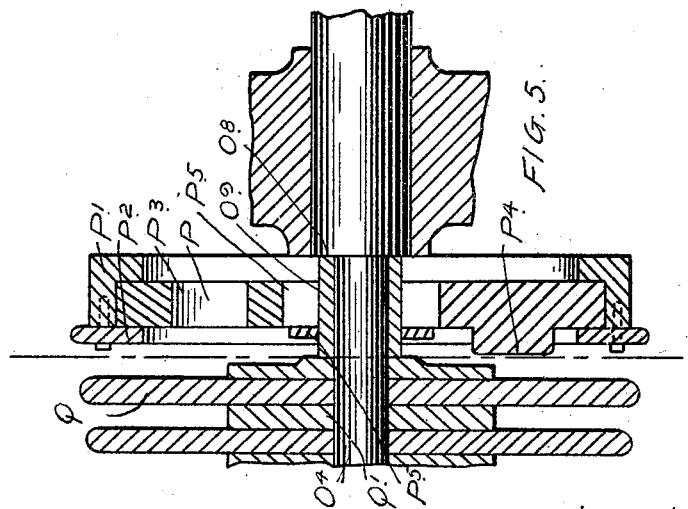

J. B. HEIGHINGTON.
MACHINE FOR TOOLING STONE.
APPLICATION FILED APR. 19, 1907.

909,296.

Patented Jan. 12, 1909.
6 SHEETS—SHEET 5.

Witnesses

Inventor
J. B. Heighington.
by
Atty.

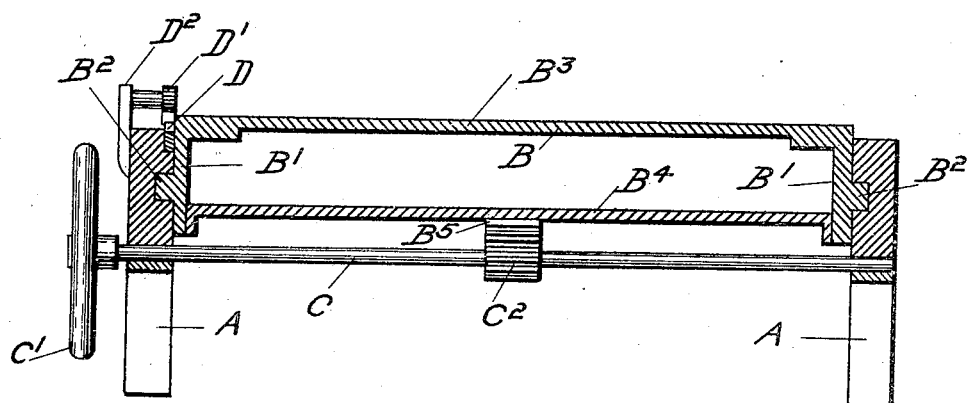
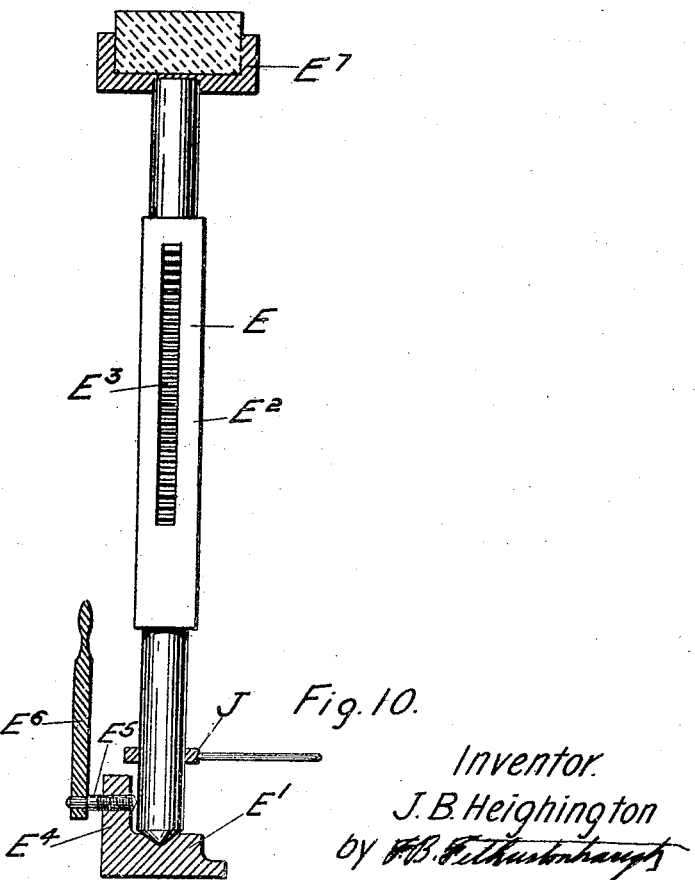

UNITED STATES PATENT OFFICE.

JOHN BRIERLY HEIGHINGTON, OF TORONTO, ONTARIO, CANADA, ASSIGNOR TO ROMAN STONE COMPANY, LIMITED, OF TORONTO, CANADA, A CORPORATION.

MACHINE FOR TOOLING STONE.

No. 909,296.   Specification of Letters Patent.   Patented Jan. 12, 1909.

Application filed April 19, 1907. Serial No. 369,106.

*To all whom it may concern:*

Be it known that I, JOHN BRIERLY HEIGHINGTON, of the city of Toronto, in the county of York, in the Province of Ontario, Canada, have invented certain new and useful Improvements in Machines for Tooling Stone, Natural or Artificial, and other Material, of which the following is the specification.

My invention relates to improvements in machines for tooling stone, natural or artificial, and other material, and the object of the invention is to devise a machine of this class, whereby stone or other material having a surface of any shape, form or contour may be tooled quickly and in a crisp manner.

A further object is to economize both time and labor in the tooling of the stone.

A still further object is to tool the stone, if desired, without disturbing it.

To effect these objects my invention consists of a special feed table to receive and adjust the stone, a vertical standard a cross frame adjustably supported thereon and a jointed arm carried by the cross frame, a cutting tool located at the outer end of the arm and means for adjusting arm and driving the same all as hereinafter described.

Figure 1:
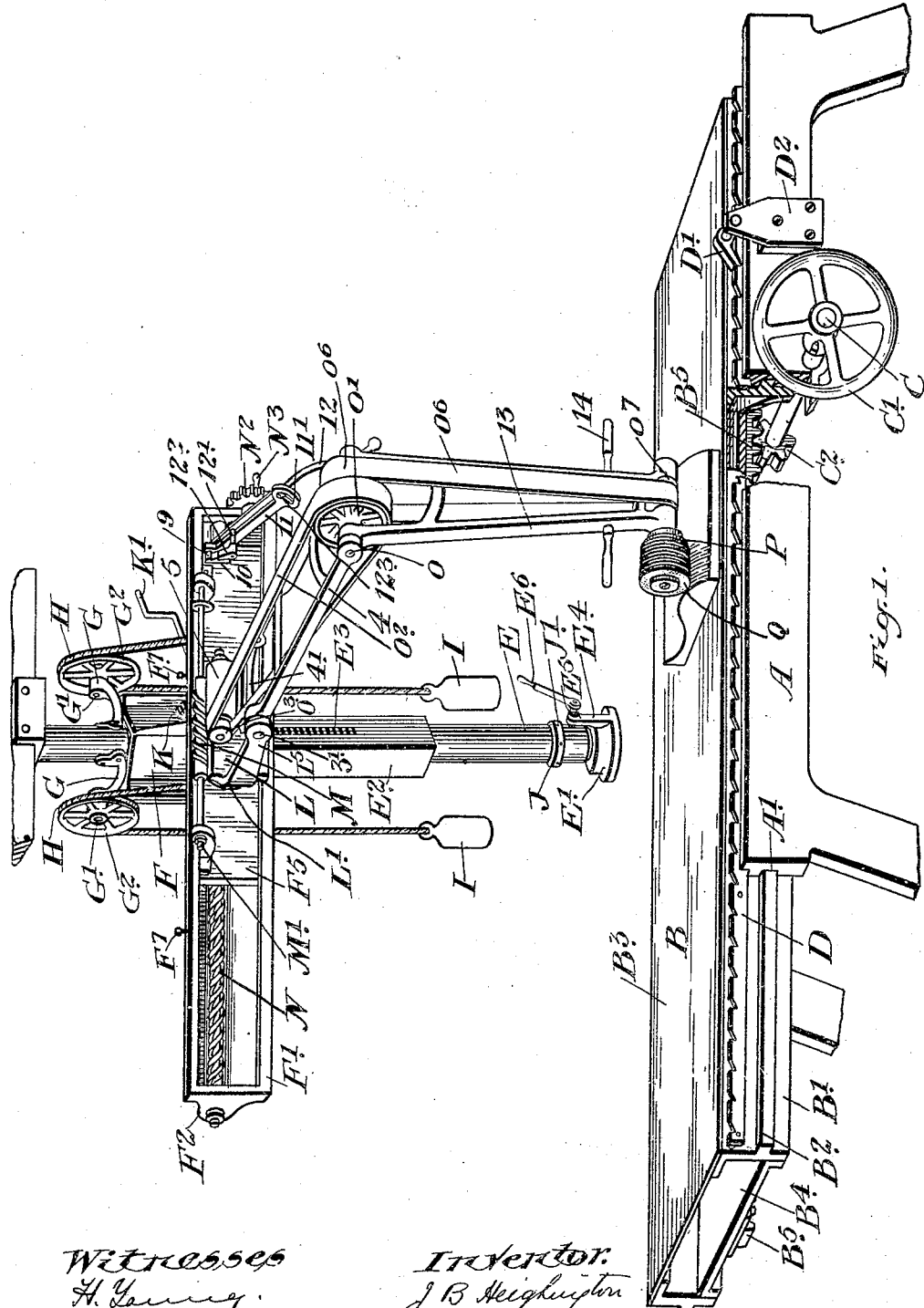
Figure 2:
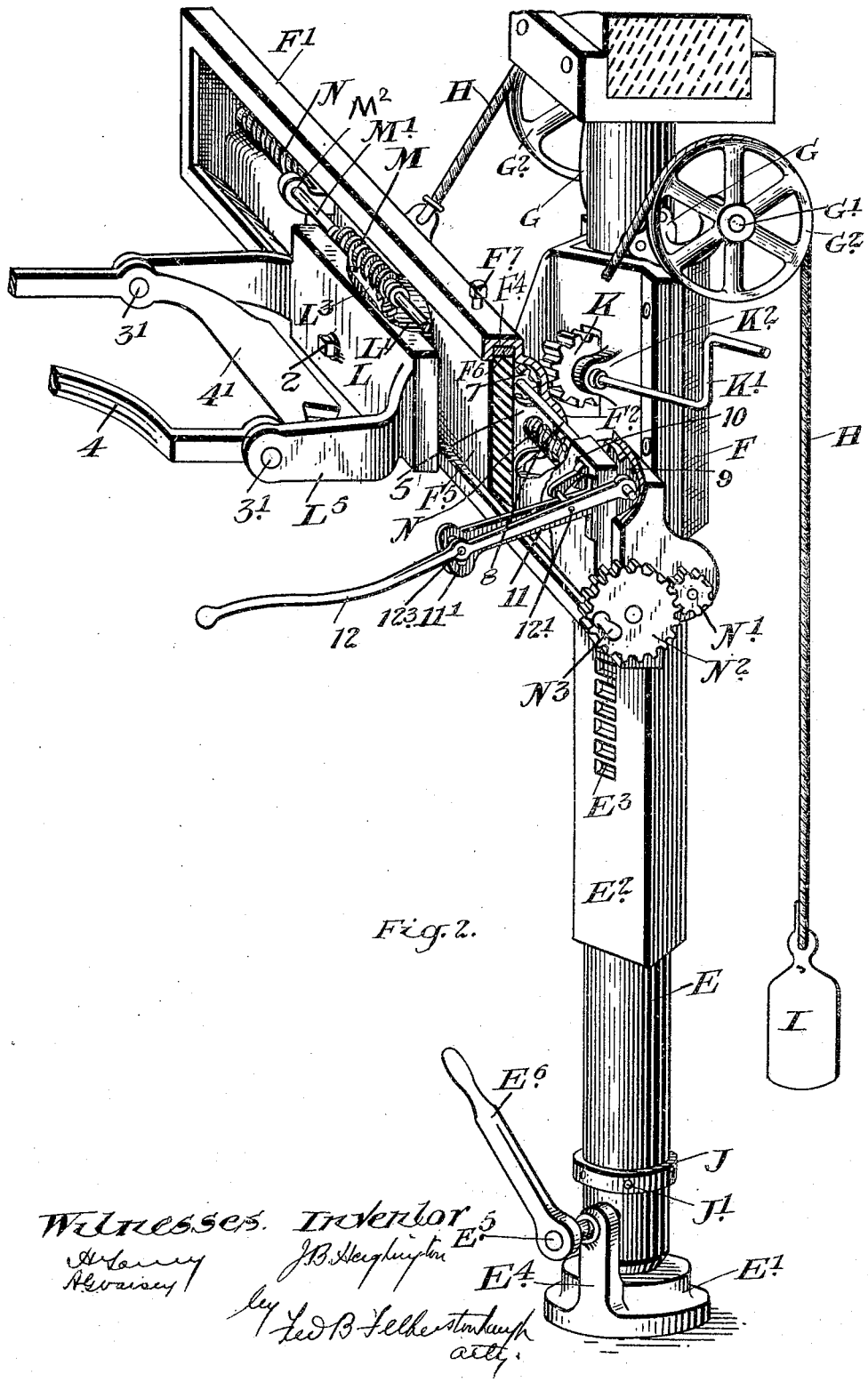
Figure 7:
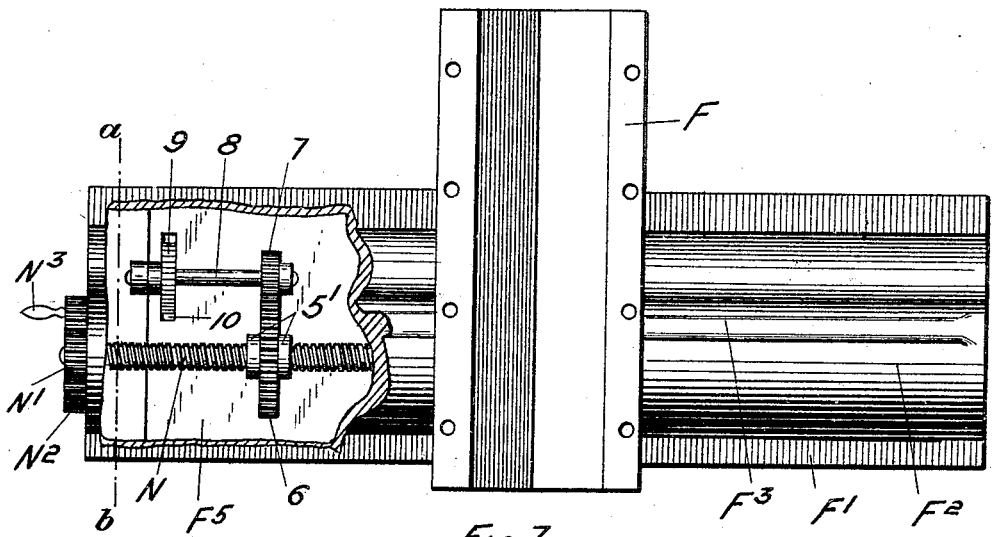
Figure 8:
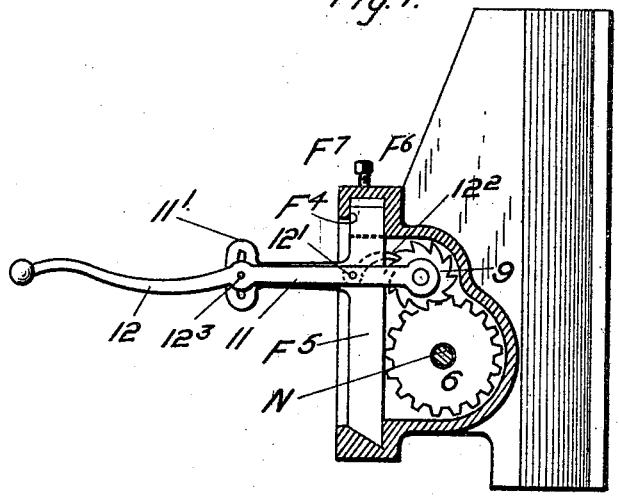

Figure 1 is a perspective view of my improved machine for tooling stone. Fig. 2, is a perspective view of the standard with the mechanism supported thereby. Fig. 3, is a view partially in section showing the arm and connection to the cross frame carried by the vertical standard. Fig. 4, is a plan view of Fig. 3, the cross frame being broken away and in section. Fig. 5, is a sectional detail of the cutting tool. Fig. 6 is a face view of the means for adjusting the cutter. Fig. 7 is a view of the cross frame looking from the back, a portion of the frame being broken away to show the worm spindle and connected parts. Fig. 8 is a cross-section on the line $a$—$b$ Fig. 7. Fig. 9 is a cross-section through the feed table, and Fig. 10 is an elevation of the standard, the bearings therefor being in section.

In the drawings like letters of reference indicate corresponding parts in each figure.

A is the frame of the table provided with a grooved guide-way $A'$.

B is the adjustable table formed with sides $B'$ having tongues $B^2$, which run in the guide-ways $A'$, a planular horizontal top $B^3$ and a bottom $B^4$ having a toothed rack $B^5$ extending underneath it from end to end.

C is an arbor provided with a hand wheel $C'$. The arbor C is journaled in suitable bearings in the frame A and provided with a pinion $C^2$, which meshes with the rack $B^5$. It will thus be seen that by means of the hand wheel the table may be adjusted into any position desired. It is held in any position to which it may be adjusted by the ratchet-shaped toothed rack D engaged by the pawl $D'$ pivoted on the bracket $D^2$ attached to the frame A.

E is a standard rotatably mounted on a suitable base $E'$ its upper end being journaled in a plate $E^7$ attached to some fixed structure. Standard E has a rectangular portion $E^2$ having a depressed toothed rack $E^3$ on one side thereof.

F is a divided sleeve rectangular in cross section fitting on the rectangular portion $E^2$ of the standard E. $F'$ is a cross frame attached to or forming part of the sleeve F.

G are brackets secured one on each side of the standard E and having studs $G'$ at their outer end upon which are journaled the pulley wheels $G^2$. The brackets G are located above the rectangular portion $E^2$ of the standard.

H are ropes connected to the cross frame $F'$ and extending over the pulleys $G^2$.

I are the counter-balancing weights located at the lower free ends of the ropes H.

J is a ring attached to or forming part of the standard E near the bottom and provided with holes $J'$ into which a lever is inserted when it is desired to turn the standard to swing the frame $F'$ to carry the tool into any desired position.

The base $E'$ is provided with an upwardly extending lug $E^4$ through which extends a screw spindle $E^5$ having at the outer end a handle $E^6$. By swinging the handle the screw spindle may be turned, so as to jam against the standard and thereby prevent it moving.

K is a pinion secured on the crank shaft $K'$, which is journaled in bearing brackets $K^2$ forming part of the divided sleeve F. The pinion K meshes with the rack $E^3$. By turning the crank handle of the shaft $K'$ the divided sleeve and consequently the frame $F'$ may be raised or lowered to any desired height.

The cross frame F' is provided with a tubular portion F², strengthening ribs F³ behind such tubular portion and forming a web between it and the divided sleeve, one portion of which the webs form a part of.

The front portion of the cross frame F is made in the form of a grooved guide-way F⁴, which carries the plate F⁵, the wear of which is taken up by a strip F⁶ located above the plate and held down by suitable set screws F⁷. The plate F⁵ is provided with a cylindrical boss F⁸ at the front having an annular groove F⁹.

L is a cross head having a cylindrical portion L', which fits exteriorly over the cylindrical portion F⁸ and has set screws L² extending therethrough into the annular groove F⁹ in order to securely hold the cross head in position and yet permit it to turn freely.

L³ is a worm wheel or rim formed on the exterior of the cylindrical portion L'.

M is a worm carried by a spindle M' journaled in suitable bearings M² forming part of the plate F⁵.

L⁴ is a hand wheel secured on the spindle M' and designed to be manipulated so as to turn by means of the worm M and worm rim L³ the cross head on its pivot pin 2, which extends through the center of the cross head and a center boss 3 forming part of the plate F⁵.

The cross head L is provided with arms L⁵ and pins 3' on the ends of which is journaled the arm frame 4. The arm frame 4 has an inwardly extending portion 4' on which is carried an electric motor 5. As the portion 4' and motor 5 are located at the inner end of the arm frame 4 it will be readily understood that they form a counter-balance for the mechanism carried on the outer end of the frame and hereinafter described.

In order to adjust the plate carrying the cross head L and arms extending outwardly from same, I provide the following mechanism.

N N is a worm spindle extending from end to end through the tubular portion F² and journaled in bearings in the ends of such tubular portion.

N' is a gear pinion secured at one end and N² is a gear wheel meshing therewith and provided with a manipulating handle N³. The worm spindle N passes through a pair of brackets 5' attached to or forming part of the plate F⁵ and also through a threaded gear pinion located between the brackets 5'.

7 is a gear pinion meshing with the gear pinion 6 and located on the spindle 8, which is journaled in suitable bearings within the tubular portion F² of the cross frame F'.

9 is a ratchet wheel secured on the spindle 8 and projecting through a slot 10 in the plate F⁵.

11 is a bracket secured to the plate F⁵ and provided with a slotted end 11'.

12 is a lever fulcrumed on the rod 8 and carrying by means of a pin 12' the pawl 12², which engages with the ratchet wheel 9.

12³ is a pin, which extends through the slot 11' and thereby serves to limit the movement of the lever, so that the lever and consequently the pawl 12² will have a regular definite step-by-step movement.

It will now be seen that by manipulating the lever 12 the plate F⁵ and mechanism and tool carried thereby may be moved laterally to any position desired accurately and with a fine adjustment, the gear wheel 7 meshing with the gear wheel 6 on the worm spindle N in order to effect this movement. To restore the plate F⁵ quickly to its initial position or primary position I utilize the hand wheel N², which turns the worm spindle N quickly in the brackets 5 and thereby adjusts the plate rapidly. Of course, it will be understood that the plate F⁵ as well as the arm and tool connected thereto may be adjusted quickly by means of the hand gear wheel N² laterally in both directions, but for fine adjustment I prefer to use the lever 12.

The frame 4 hereinbefore referred to carries at the outer end a spindle O, which carries the pulley O'. The pulley O' is connected by a belt O² to a pulley O³ on the shaft of the motor 5.

13 is an arm frame journaled on the spindle O on each side of the pulley O' and carrying at the lower end the spindle O⁴.

O⁵ is a pulley secured on the shaft O and connected by a belt O⁶ to a pulley O⁷ on the spindle O⁴.

14 are handles secured to the frame 13 on each side thereof and designed for the purpose of swinging said frame as desired.

The spindle O⁴ is provided with an enlargement forming a shoulder O⁸ against which fits a loose sleeve O⁹.

P is a disk provided with a central slot P⁵ through which extends the sleeve O⁹.

P⁶ is a plate having a central opening loosely fitting the sleeve O⁹ and vertical slots P⁸ through which extends set screws P⁷ securing the plate P⁶ to the disk P and thereby mounting the disk P on the sleeve so as to be capable of adjustment. The disk P is also provided with a hole P³ and weighting boss P⁴.

P' is a disk provided with an outer rim within which fits the disk P secured therein by the annular gaging ring P² fastened to the face of the rim.

Q are a series of disks of carborundum or other suitable cutting material, which are separated by washers Q', the innermost of which abuts the bushing O⁹. The disks which form the cutting tool for the stone are held in place by a nut Q² on the outer reduced threaded end of the spindle O⁴.

It will also be seen that by adjusting the set screws P⁷, that the depth of the cut may be regulated as well as the wear of the cutting disk forming the cutting tool compensated for.

By such a construction as I describe I am enabled not only to feed the stone into any position underneath the tool Q, but also I am enabled to move the tool located on the free end of the double-jointed arm 4, 13, laterally on the tubular frame F' to any point desired. As the tool is balanced it is readily manipulated. The position of the tool and the frame, which carries it, may be also raised or lowered with facility and the frame and tool may be swung to any desired position laterally, so that the tool may be worked at any desired angle horizontally. It may be also worked obliquely for it will be readily seen that the arm 4 carrying the tool is capable of being swung on its pivot pin 2 by means of the worm M operated through the hand wheel $L^4$. I have, therefore, provided in my invention a most complete means whereby a tool may be manipulated to perform all functions necessary to tool stone into all practical shapes or contours.

What I claim as my invention is:

1. In a machine for tooling stone and the like, the combination with the frame and table supported in guide-ways thereon, of a rack extending longitudinally underneath the table, a shaft journaled in suitable bearings and provided with a pinion for meshing with the rack, a hand wheel on the outer end of the shaft, a toothed rack located on the edge of the table and a pawl suitably supported and engaging therewith as and for the purpose specified.

2. In a machine of the class described, a tool carrying arm, an arbor journaled in the end thereof, rotary tooling disks secured on the end of the arbor, means for driving the arbor, a disk mounted on the arbor, an annular gaging ring secured to the disk, and a weighted boss on the disk for holding it normally in the predetermined position, as and for the purpose specified.

3. In a machine of the class described, a tool carrying arm, an arbor journaled in the end thereof, and rotary tooling disks secured to the arbor, means for driving the arbor, a plate mounted on a sleeve surrounding the arbor, a disk provided with a slot into which the sleeve fits and by means of which the disk is vertically adjustable, means for securing the plate to the disk, and an annular gaging ring held on to disk as and for the purpose specified.

4. In a machine of the class described, a vertical standard supported in suitable bearings at the top and bottom, a tool carried thereby and means for turning the standard and means for clamping it when turned as and for the purpose specified.

5. In a machine of the class described, a vertical standard rotatably supported in suitable bearings at the top and bottom, a tool carried by the standard, a lever provided with a screw spindle at the lower end, designed to clamp the standard when the lever is turned, and a boss through which the spindle extends as and for the purpose specified.

6. The combination with the standard and divided sleeve slidable vertically thereon and a frame supported by the sleeve having a tubular portion, and longitudinal guide ways formed in the frame, of a plate located in the guide ways and an arm and tool carried by the plate and means for adjusting the plate longitudinally in the guide ways as and for the purpose specified.

7. The combination with the standard and divided sleeve and frame having a tubular portion, and longitudinal guide ways formed in the frame, of a plate located in the guide ways, an arm and tool carried by the plate, brackets secured at the rear of the plate, a worm spindle journaled in the frame and extending through the aforesaid brackets, a threaded gear wheel mounted on the spindle between the brackets, and means for turning the worm spindle in its bearings, as and for the purpose specified.

8. The combination with the standard and divided sleeve and frame having a tubular portion, and longitudinal guide ways formed in the frame, of a plate located in the guide ways, an arm and tool carried by the plate, brackets secured at the rear of the plate, a worm spindle journaled in the frame and extending through the aforesaid brackets, a threaded gear wheel mounted on the spindle between the brackets, and a pinion on one end of the worm shaft, a gear wheel meshing therewith and provided with a suitable handle as and for the purpose specified.

9. The combination with the standard and divided sleeve, and a frame having a tubular portion, and longitudinal guide ways formed in the frame, of a plate located in the guide ways, an arm and tool carried by the plate, brackets secured at the rear of the plate, a worm spindle journaled in the frame and extending through the aforesaid brackets, a threaded gear wheel mounted on the spindle between the brackets, a supplemental spindle journaled in suitable bearings on the plate, a pinion mounted on the spindle and meshing with the aforesaid gear wheel, a lever fulcrumed on the end of the spindle a ratchet wheel carried by the spindle, an arm carried by the plate and provided with a slotted end, a pawl carried by the lever and meshing with the ratchet wheel, and a pin carried by the lever engaging the slot, as and for the purpose specified.

10. The combination with the standard and divided sleeve and a frame having a tubular portion, and longitudinal guide ways formed in the frame, of a plate located in the guide ways an arm and tool carried by the plate, brackets secured at the rear of the plate, a worm spindle journaled in the frame and extending through the aforesaid brackets, a threaded gear wheel mounted on the spindle between the brackets, a supplemental spindle journaled in suitable bearings on the plate, a pinion mounted on the spindle and meshing with the aforesaid gear wheel, a lever fulcrumed on the end of the spindle, a ratchet wheel carried by the spindle, a pawl carried by the lever, and means for limiting the motion of the lever, as and for the purpose specified.

11. The combination with the standard and a sleeve vertically slidable thereon, and a cross frame secured to or forming part of the sleeve, and guide ways formed in the front of the frame, of a plate located in the guide ways, a pivot projecting from the plate, and a tool carrying arm mounted on the pivot and adapted to be swung thereon, as and for the purpose specified.

12. The combination with the standard and sleeve and cross frame secured to or forming part of the sleeve provided at the front with suitable guide ways, of a plate located in said guide ways and provided with a forwardly extending cylindrical boss, an arm frame, a cross head to which the arm frame is pivoted, a cylindrical portion formed on the cross head and fitting over the cylindrical boss of the plate, a cylindrical pin extending through the crosshead into the plate and means for turning the cylindrical portion of the crosshead on the cylindrical boss of the plate as and for the purpose specified.

13. The combination with the standard and sleeve and cross frame secured to or forming part of the sleeve and provided at the front with suitable guide ways, of a plate located in said guide ways and provided with an outwardly extending cylindrical boss, an arm frame, a cross head on which the arm is pivoted, a cylindrical portion formed on the crosshead and fitting over the cylindrical boss, a central pin extending through the crosshead into the plate, a worm rim formed on the cylindrical portion of the crosshead, a worm secured on a suitable arbor and meshing with the worm rim and journaled in suitable bearings and means for turning the arbor as and for the purpose specified.

14. The combination with the frame, plate and a crosshead and arms projecting forwardly from the crosshead, of an arm frame journaled in the arms, a spindle located at the outer end of the arm frame, a motor on the inner end of the arm frame, a supplemental arm frame journaled on the spindle at the outer end of the aforesaid arm frame, a tool located on the free end of the outermost arm frame and means for driving the tool from the motor as and for the purpose specified.

JOHN BRIERLY HEIGHINGTON.

Witnesses.
   B. Boyd,
   R. M. Cobain.